(No Model.)

F. J. SMITH.
SCREW CUTTING DIE.

No. 437,385. Patented Sept. 30, 1890.

Witnesses.

Inventor,
Frederick J. Smith
by S. N. Piper, atty.

UNITED STATES PATENT OFFICE.

FREDERICK J. SMITH, OF MANSFIELD, MASSACHUSETTS, ASSIGNOR TO S. W. CARD & CO., OF SAME PLACE.

SCREW-CUTTING DIE.

SPECIFICATION forming part of Letters Patent No. 437,385, dated September 30, 1890.

Application filed January 27, 1890. Serial No. 338,200. (No model.)

*To all whom it may concern:*

Be it known that I, FREDERICK J. SMITH, a citizen of the United States, residing at Mansfield, in the county of Bristol and State of Massachusetts, have invented certain new and useful Improvements in Screw-Cutting Dies; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
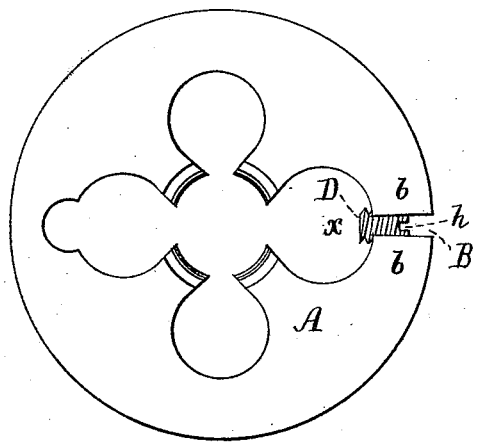
Figure 4:
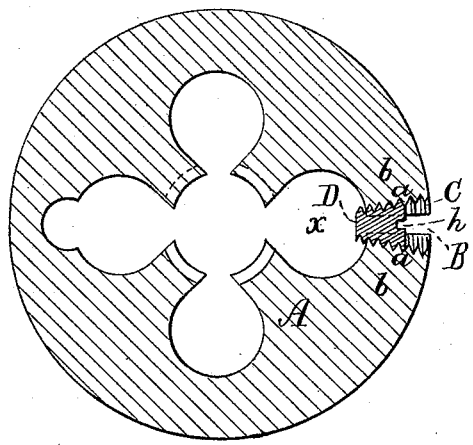
Figure 2:
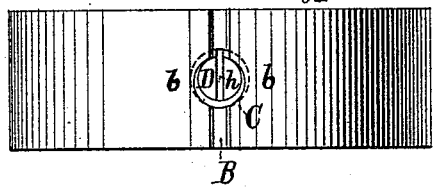
Figure 3:
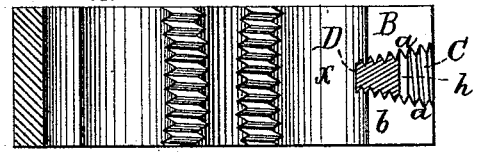

Figure 1 is a top view, Fig. 2 an edge view, Fig. 3 a transverse and vertical section, and Fig. 4 a horizontal section, of a screw-cutting die provided with my improvement.

The object of my improvement is to furnish a screw-cutting die split in one side, with means for conveniently operating the jaws for the purpose of varying the size of the cutting-orifice of the said die, the nature of my improvement being defined in the claims hereinafter presented.

In carrying out my improvement I take a split screw-cutting die A of ordinary construction and form in it, so as to be equally arranged in the walls of the split B therein, a tapering hole C, said hole extending from the periphery of the die into one of the clearance-passages x thereof, its axis being parallel with the faces of the die, and said hole I provide with a female screw-thread a, to receive the thread of a tapering screw D, nicked in its outer or head end, as shown at h. In applying the screw D to the said hole C of the die after engaging the threads the said screw is revolved and made to expand or spring apart the jaws b b of the die on each side of the split, the head end of said screw, when the jaws are sufficiently expanded, being nearer to the axis of the die than the periphery of said die is to said axis, as represented in Figs. 3 and 4, so that when the said screw is turned backward to reduce the size of the cutting-orifice of the die the walls of the split B will approach and touch or nearly touch each other when the head end of said screw is flush with the periphery of the die. By this arrangement the head end of the screw D will not extend beyond the periphery of the die when the cutting-orifice is reduced to its smallest size, and thus can be no obstruction to the proper seating of the die in the stock, and the said die is provided with a convenient means for varying the size of its cutting-orifice, the desired adjustment being easily effected by revolving the screw D by means of a driver applied to the nick in its head end.

I am aware that a tapering pin applied to a tapering hole in a screw-cutting die split at one side has been used to vary the size of the cutting-orifice of said die, and therefore I do not claim such. My improvement admits of a finer adjustment of the jaws of the die, is more reliable in its action than a sliding pin, and is a much more convenient means for effecting said adjustment, particularly when it is desired to reduce the size of the cutting-orifice of said die, it being a difficult matter to get at the inner end of a sliding pin to move it outward.

I am aware of the patent granted to A. I. Polk, No. 321,755, dated July 7, 1885, and therefore make no claim to anything shown therein; but

What I claim is—

1. A screw-cutting die split at one side in line with the axis of its cutting-orifice and provided with a tapering screw-threaded hole arranged equally in the spring-jaws thereof, the axis of said hole being parallel with the faces of the die and at right angles to the axis of the cutting-orifice thereof, and a tapering screw so adapted to said tapering hole that when revolved therein the cutting-orifice of the die will be varied in size, as explained.

2. The combination of the screw-cutting die A, provided with the split B, and the tapering screw-threaded hole C, arranged equally in the jaws of the die, the axis of said hole being parallel to the faces of said die and at right angles to the axis of the cutting-orifice thereof, with the tapering screw D so adapted to said tapering hole that when the cutting-orifice is adjusted to its smallest size the head end of said screw will be flush with or will not project beyond the periphery of said die, as explained.

In testimony whereof I affix my signature in presence of two witnesses.

FREDERICK J. SMITH.

Witnesses:
S. W. CARD,
S. N. PIPER.